United States Patent
Shah et al.

(10) Patent No.: US 7,782,940 B2
(45) Date of Patent: Aug. 24, 2010

(54) METHODS FOR ENCODING OR DECODING IN A VIDEOCONFERENCE SYSTEM TO REDUCE PROBLEMS ASSOCIATED WITH NOISY IMAGE ACQUISITION

(75) Inventors: Mohammad Athar Shah, Austin, TX (US); Michael J. Horowitz, Austin, TX (US)

(73) Assignee: Polycom, Inc., Pleasanton, CA (US)

( * ) Notice: Subject to any disclaimer, the term of this patent is extended or adjusted under 35 U.S.C. 154(b) by 1876 days.

(21) Appl. No.: 10/633,137

(22) Filed: Aug. 1, 2003

(65) Prior Publication Data

US 2005/0025369 A1    Feb. 3, 2005

(51) Int. Cl.
    H04N 7/18    (2006.01)
(52) U.S. Cl. .......................... 375/240.04; 375/240.05; 375/240.06
(58) Field of Classification Search .................................. 375/240.01–240.29
    See application file for complete search history.

(56) References Cited

U.S. PATENT DOCUMENTS

| | | | | |
|---|---|---|---|---|
| 5,155,594 A | | 10/1992 | Bernstein et al. | 375/240.14 |
| 5,231,484 A | * | 7/1993 | Gonzales et al. | 375/240.04 |
| 5,737,537 A | | 4/1998 | Gardos et al. | |
| 5,796,434 A | * | 8/1998 | Lempel | 348/403.1 |
| 5,805,228 A | | 9/1998 | Proctor et al. | 375/240.22 |
| 5,926,226 A | | 7/1999 | Proctor et al. | 375/240.22 |
| 6,173,069 B1 | | 1/2001 | Daly et al. | 382/118 |
| 6,192,148 B1 | | 2/2001 | Lin | |
| 6,212,235 B1 | | 4/2001 | Nieweglowski et al. | 375/240.08 |
| 6,269,078 B1 | | 7/2001 | Lakshman et al. | 370/230 |
| 6,275,527 B1 | | 8/2001 | Bist et al. | |
| 6,292,589 B1 | | 9/2001 | Chow et al. | |
| 6,327,392 B1 | * | 12/2001 | Li | 382/248 |
| 6,360,017 B1 | * | 3/2002 | Chiu et al. | 382/239 |
| 6,400,996 B1 | | 6/2002 | Hoffberg et al. | 700/83 |
| 6,483,876 B1 | * | 11/2002 | Chang et al. | 375/240.16 |
| 6,618,507 B1 | * | 9/2003 | Divakaran et al. | 382/236 |

(Continued)

OTHER PUBLICATIONS

Turaga, D. et al. "Classification Based Mode Decisions for Video Over Networks." IEEE Transactions on Multimedia 3 (2001) 41-52.

(Continued)

Primary Examiner—Andy S Rao
(74) Attorney, Agent, or Firm—Wong, Cabello, Lutsch, Rutherford & Brucculeri, L.L.P.

(57) ABSTRACT

Disclosed herein in one embodiment is an adaptive coding threshold algorithm for a videoconference system which alleviates problems due to the erroneous recoding of stationary areas of images caused by image noise. The algorithm, which is preferably implementable on a videoconference encoder, assesses the coding parameters for a current macroblock and the coding parameters for that same macroblock the last time it was coded. If for both macroblocks the coding was non-intra, with a [0,0] motion vector, and with a low quantization parameter, a determination is made that the current macroblock depicts a stationary image. Accordingly, the algorithm increases the coding threshold ($T_1$) for the blocks within that macroblock, so that it becomes more difficult for those particular blocks to be recoded. This renders the block with stationary content less susceptible to erroneous recoding, while preserving system bandwidth and improving image quality. Additionally, related noise assessment techniques can be employed at the encoder or decoder without the adjustment of the coding threshold $T_1$.

31 Claims, 7 Drawing Sheets

U.S. PATENT DOCUMENTS

| | | | |
|---|---|---|---|
| 6,842,483 B1 * | 1/2005 | Au et al. | 375/240.16 |
| 6,870,883 B2 * | 3/2005 | Iwata | 375/240.01 |
| 6,995,805 B1 * | 2/2006 | Park | 348/700 |
| 2003/0133169 A1 | 7/2003 | Uchibayashi et al. | |

OTHER PUBLICATIONS

Search Report on Application No. 04018167.9-2223 PCT. European Patent Office. Oct. 7, 2005.

* cited by examiner

METHODS FOR ENCODING OR DECODING IN A VIDEOCONFERENCE SYSTEM TO REDUCE PROBLEMS ASSOCIATED WITH NOISY IMAGE ACQUISITION

FIELD OF THE INVENTION

The present invention relates generally to a video conferencing system, and more particularly to a system having an improved coding scheme to more efficiently deal with the processing of non-moving and/or non-changing areas of images, particularly when utilized in conjunction with MPEG-1, MPEG-2, MPEG-4 (part 2), H.261, H.263, and H.264 video encoding/decoding algorithms.

BACKGROUND

Figure 1:
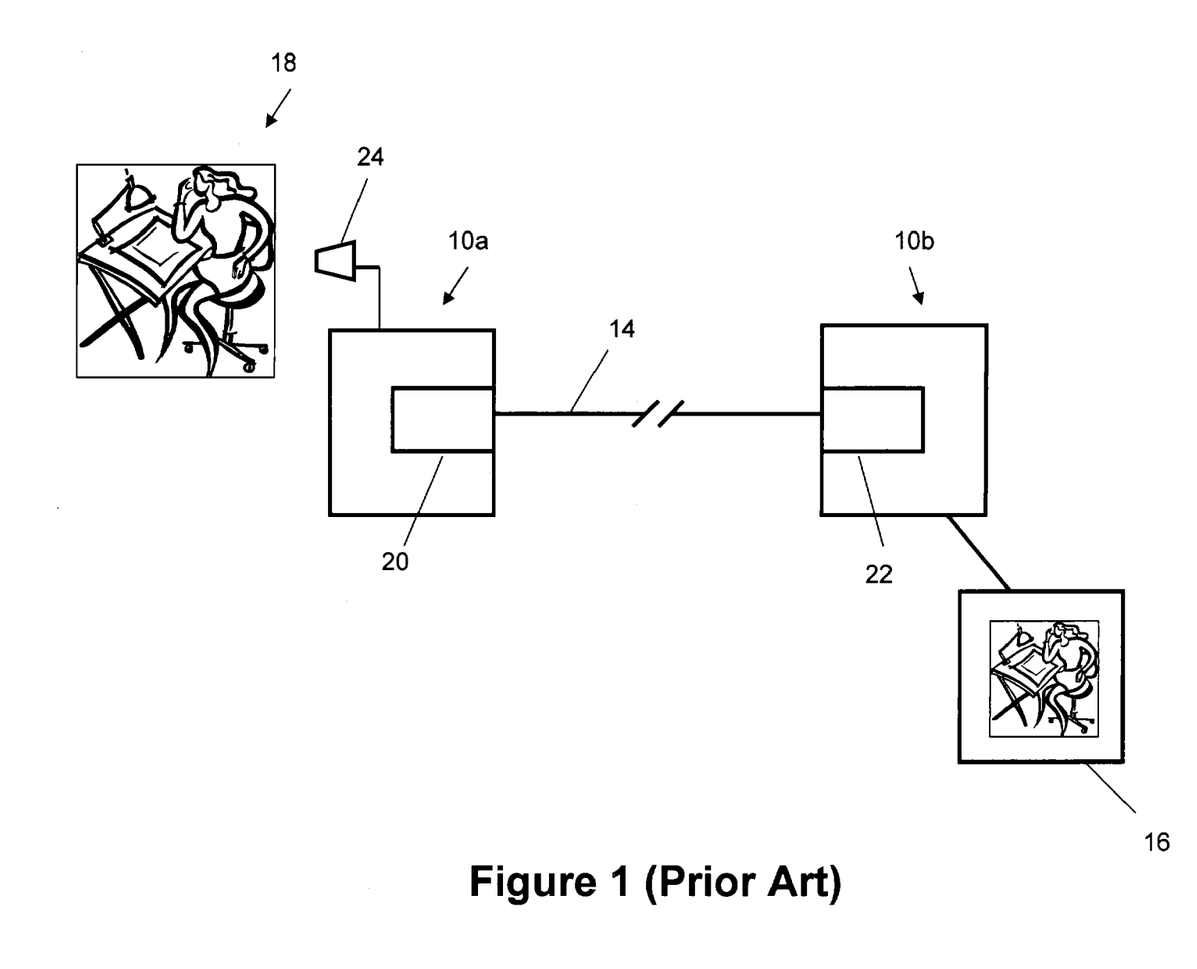
FIG. 1 shows a prior art videoconferencing system.

Video conferencing systems 10a,b, such as shown in FIG. 1, are used for example to connect corporate meeting rooms or other sites by a real (or quasi real) time video link 14, allowing conference participants in two or more sites to in effect meet and see one another without the necessity of traveling. The link 14 between the sites may be accomplished through many known media, such as through phone lines or other wiring, or by a wireless link, and may additionally contain audio information indicative of the conversations being had by the conference participants. The data transmitted over link 14 generally comprises digitized information indicative of the images (e.g., 18) present at the sites, and is displayable on a monitor 16 associated at least with the receiving videoconference system 10b. (Only a one-way video communication link is illustrated in FIG. 1 for simplicity, although one skilled in the art will understand that link 14 is typically a two-way link, and that each videoconference system 10a,b is typically identical in its makeup to allow for two-way communication).

There is much to be gained in the efficient initial processing, or encoding, of the images at a site prior to their transfer to the decoders at other sites. For example, an image 18 being broadcast to another site will generally have moving (e.g., people) and non-moving (e.g., tables, wall coverings, etc.) components. To reduce the burden of transferring the image, such non-moving portions of the image are preferably not recoded by the encoder 20 of the sending system. In other words, for those portions of the image that are deemed to be non-moving or not changing by the encoder and have been previously encoded and sent to the decoder with sufficient quality, the encoder will simply inform the receiving decoder 22 to reconstruct the same portion of the image from the previously decoded image, rather than resending image data for that portion.

The digitization of the image formed by the optics of camera 24 causes distortion in the digitized image data, referred to as image noise. As each subsequent image is captured, and because this distortion is temporal in nature, image data can change even when there is no change in the image 18. However, even with the use of state of the art noise reduction filters, some noise can remain in the image. Accordingly, it can be difficult for the encoder 20 to digitally determine if portions of the image 24 are moving and/or changing, or whether the perceived change or motion is merely due to noise. This problem can be addressed by the encoder 20 by assessing a threshold which determines the magnitude of change in a portion of the image. Thus, if the magnitude of change for a portion of the image is lower than some acceptable coding threshold ($T_1$), the encoder 20 concludes that the image portion is non-moving and will transmit such a conclusion to the receiving decoder(s) without recoding that portion of the image. If the degree of change is greater than $T_1$, the encoder similarly concludes that the image portion is moving or changing, and more detailed processing and recoding of that image portion is performed prior to transfer.

Choosing the appropriate coding threshold $T_1$ can be a difficult task, and can lead to false conclusions. For example, if $T_1$ is set too low, the encoder 20 can draw the erroneous conclusion that the image portion is moving and/or changing, which can causes the image portion to be needlessly recoded and rebroadcast. This can lead to an image which appears on the monitor 16 at the receiving end to move or "swim," which is visually annoying and not desirable. Moreover, the erroneous conclusion causes the unnecessary recoding and transfer of image data which constrains the limited bandwidth of link 14. By contrast, if $T_1$ is set too high, the encoder may erroneously conclude that the image portion is not moving or not changing, when in fact it is moving or changing, leading to a similarly undesirable effect visual effect at the receiving end because moving or changing areas will erroneously appear to be static.

In addition to applying a threshold, the encoder could improve the noise detection algorithm by checking for noise only if the encoder has determined that the particular image portion will be coded using a [0,0] motion vector (i.e., if the encoder concludes that the portion is not moving), an approach that has been used in the prior art. However, this scheme suffers from potentially incorrectly deciding that a portion is non-moving when in fact it is changing to some degree, and therefore: not coding that portion at all based on the threshold. If this occurs, actually changing portions are not updated by the encoder, and hence appear static at the display 16 on the receiving end.

Accordingly, the videoconference art would benefit from a more efficient scheme for encoding image data prior to its transfer, and would particularly benefit from an improved scheme for distinguishing between portions of an image which are moving and/or changing and portions of the image which are static or stationary.

SUMMARY OF THE DISCLOSURE

Disclosed herein in one embodiment is an adaptive coding threshold algorithm for a videoconference system which alleviates problems due to the erroneous recoding of stationary areas of images caused by image noise. The algorithm, which is preferably implementable on a videoconference encoder, assesses the coding parameters for a current macroblock and the coding parameters for that same macroblock the last time it was coded. If for both macroblocks the coding was non-intra, with a [0,0] motion vector, and with a low quantization parameter, a determination is made that the current macroblock depicts a stationary image. Accordingly, the algorithm increases the coding threshold ($T_1$) for the blocks within that macroblock, so that it becomes more difficult for those particular blocks to be recoded. This renders the block with stationary content less susceptible to erroneous recoding, while preserving system bandwidth and improving image quality. Additionally, related noise assessment techniques can be employed at the encoder or decoder without the adjustment of the coding threshold $T_1$.

BRIEF DESCRIPTION OF THE DRAWINGS

The foregoing summary, preferred embodiments, and other aspects of the inventive concepts will be best understood with reference to a detailed description of specific embodiments, which follows, when read in conjunction with the accompanying drawings, in which.

DETAILED DESCRIPTION

In the interest of clarity, not all features of actual implementations of an adaptive coding threshold for a videoconference system are described in the disclosure that follows. It should be appreciated that in the development of any such actual implementation, as in any such project, numerous engineering and design decisions must be made to achieve the developers' specific goals, e.g., compliance with mechanical and business related constraints, which will vary from one implementation to another. While attention must necessarily be paid to proper engineering and design practices for the environment in question, it should be appreciated that the development of an adaptive coding threshold for a videoconference system would nevertheless be a routine undertaking for those of skill in the art given the details provided by this disclosure.

Figure 2:
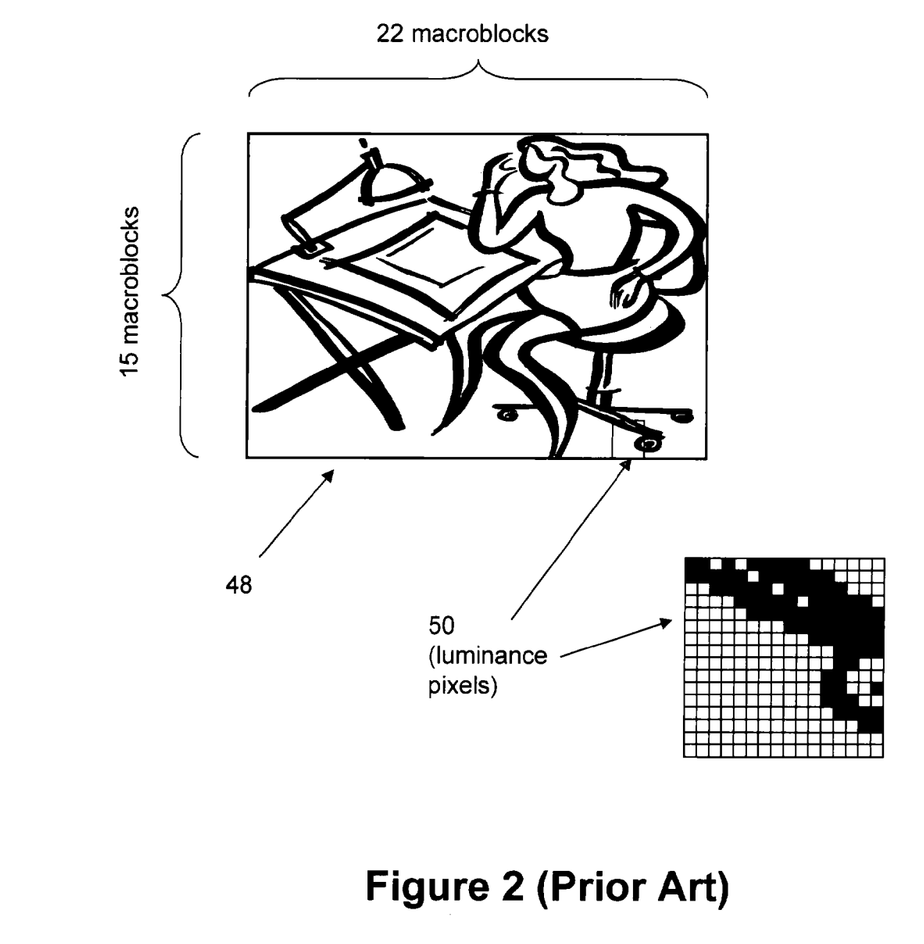
FIG. 2 shows an exemplary image to be transmitted by the videoconferencing system, and the image's division into macroblocks.

Referring to FIG. 2, and as is well known, images 48 in videoconference systems are typically parsed and processed in macroblocks 50, each of which constitutes a 16×16 luminance (i.e., light/dark) pixels and two 8×8 chrominance (i.e., color) pixels. An exemplary image 48 at SIF Resolution (352×240 pixels) might contain 330 macroblocks (i.e., 22×15 macroblocks). In the coding/decoding schemes described herein, the motion estimation analysis and the intracode vs. intercede decision is preferentially made on the basis of the luminance data alone, although one skilled in the art will recognize that the disclosed technique can be implemented with the use of chrominance data as well. Although FIG. 2 illustrates an image 48 containing black and white pixels, one skilled in the art understands that luminance reflects a grey scale, and in reality each pixel is associated with a gray scale digital value of, for example, 0 (black) to 255 (white).

Prior to disclosure of the adaptive coding scheme that is the focus of this disclosure, some description of the prior art is warranted, although many of the details are omitted as they are well known to those of skill in the video compression arts. Special attention is provided with respect to aspects of the H.263 video compression standard, to which this disclosure has particular applicability, although the disclosure has applicability to other video compression standards as well, such as MPEG-1, MPEG-2, MPEG-4 (part 2), H.261 and H.264. All of these well-known video compression standards are incorporated herein by reference.

An exemplary encoder in videoconferencing equipment utilizing the H.263 video compression standard uses the principal of motion estimation to decide how to encode a particular macroblock 50. Through motion estimation and rate distortion analysis, the encoder decides whether the macroblock 50 is to be intercoded, intracoded, or not coded at all. To make this decision, the encoder tries to find the best match for the current macroblock 50 in previously encoded images. (Alternatively, and as one skilled in the art understands, comparisons can be made with respect to multiple reference images, as well as other coded areas in the current image, but such modifications are not discussed for simplicity). As is known, the current macroblock can be translated by a number of pixels from left to right, and up and down, to see how its luminance data matches with respect to the previously coded areas: of the image. Matching can be accomplished through the use of error minimization, such as through an assessment of the summation of a squared difference or an absolute difference between the luminance samples in the current macroblock and the predicted macroblock, as is known. For example, if a person in an image is moving, the macroblocks covering the person in the current frame might match (from an error minimization standpoint) macroblocks in the previous frame, but be shifted right two pixels and down four pixels. In other words, those particular macroblocks in the current frame can be predicted from the macroblocks in the previous frame by a motion vector of [2,4]. If no shifting is required to minimize the error between the macroblocks in the current frame and the same macroblocks in the previous frame, then those current macroblocks can be predicted by a motion vector of [0,0], which leads to a conclusion that the image within that macroblock has not moved. Furthermore, in some cases (for example, H.263 Annex F and H.264) each smaller block within the macroblock can have its own motion vector. (As will be explained further below, each macroblock can be subdivided into a plurality of blocks. For instance, a 16×16 pixel macroblock can be subdivided into four 8×8 pixel blocks).

Should the minimum error (corresponding to the match) be below a certain threshold ($T_2$), the encoder can decide to intercode the macroblock, although one skilled in the art will recognize that other determinations can be assessed before this interceding decision is firmly made. If an interceding decision is made by the encoder, rather than encoding the entire macroblock from scratch (i.e., by intracoding, which will be described momentarily), the encoder transmits a representation of the difference between the current macroblock and the predicted macroblock along with the motion vector or motion vectors for the individual blocks, as will be explained further with reference to FIGS. 3 and 4. The interceding mode provides much better compression than the intracoding mode.

Should motion estimation result in an error minimization that exceeds the threshold $T_2$, then it is possible that the current macroblock cannot be effectively predicted from a previous image. The encoder may instead decide to intracode the macroblock, i.e., to encode the macroblock from scratch without using a prediction stemming from the previous image.

It is useful to note at this point that the threshold $T_2$ used to determine how to code a particular macroblock (i.e., as intercede or intracode) is a different determination from the determination mentioned in the Background section, i.e., whether the macroblock, and more specifically an individual block within that macroblock, needs to be coded at all. This latter determination (whether-to-code as opposed to how-to-code) preferably depends on the assessment of a different threshold $T_1$. In a preferred embodiment, the how-to-code determination is made for the entire macroblock first (using $T_2$), and if interceding is determined, then a whether-to-code determination is made for each block within that macroblock (using $T_1$), although both determinations can be made regardless. It is preferred that the how-to-code error determination ($T_2$) is computed using the sum of the absolute difference between the current and predicted luminance samples (e.g., using block 60 in FIG. 3), while the whether-to-code determination ($T_1$) (the "coding threshold") is computed using the sum of the squares of the differences in a transformed, quantized block (e.g., block 69 in FIG. 4). One skilled in the art will recognize that other error schemes may be used to determine either of these thresholds.

Figure 3:
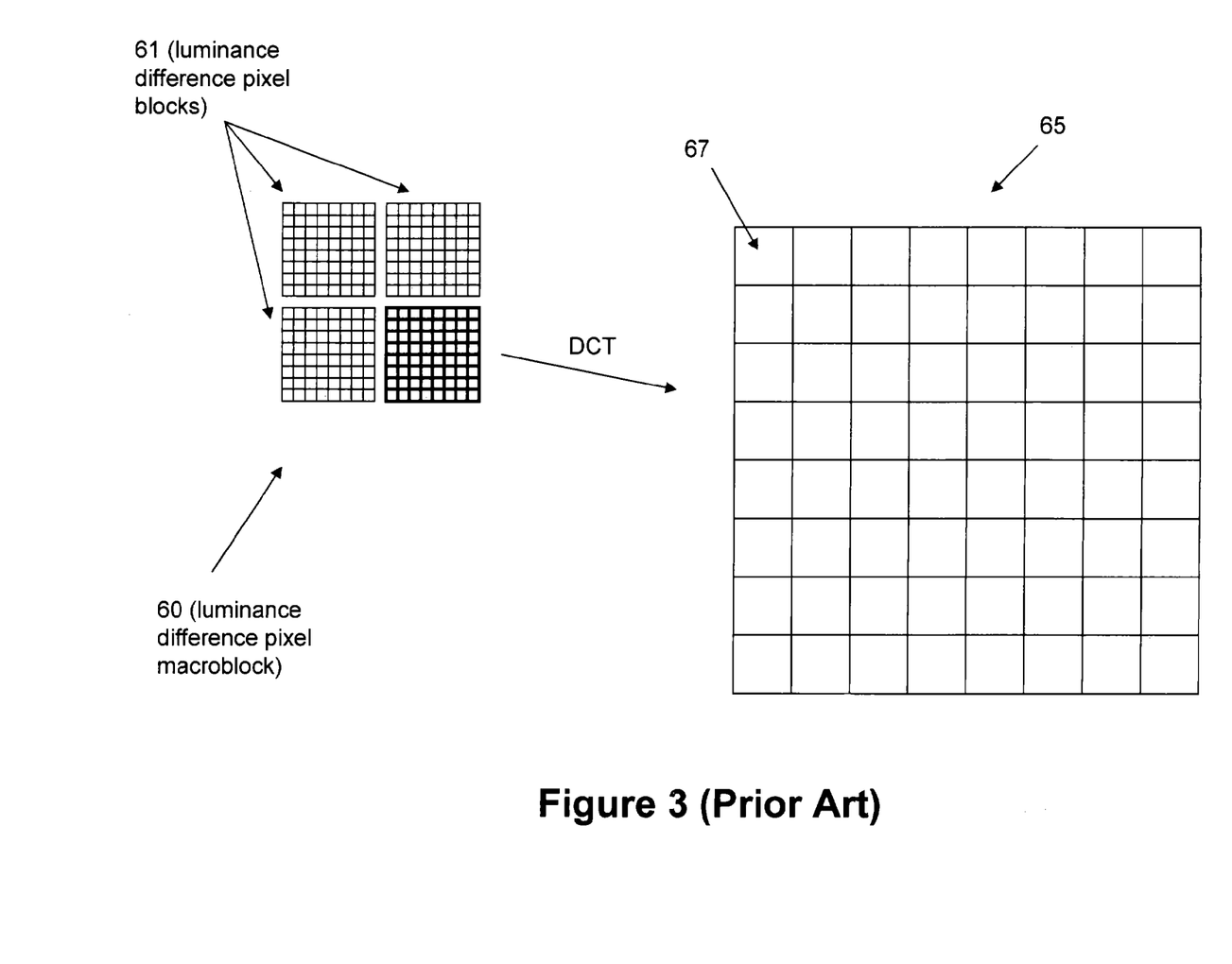
FIG. 3 shows a macroblock of matrix pixels, and their conversion into smaller matrix blocks using a Discrete Cosine Transform (DCT).
Figure 4:
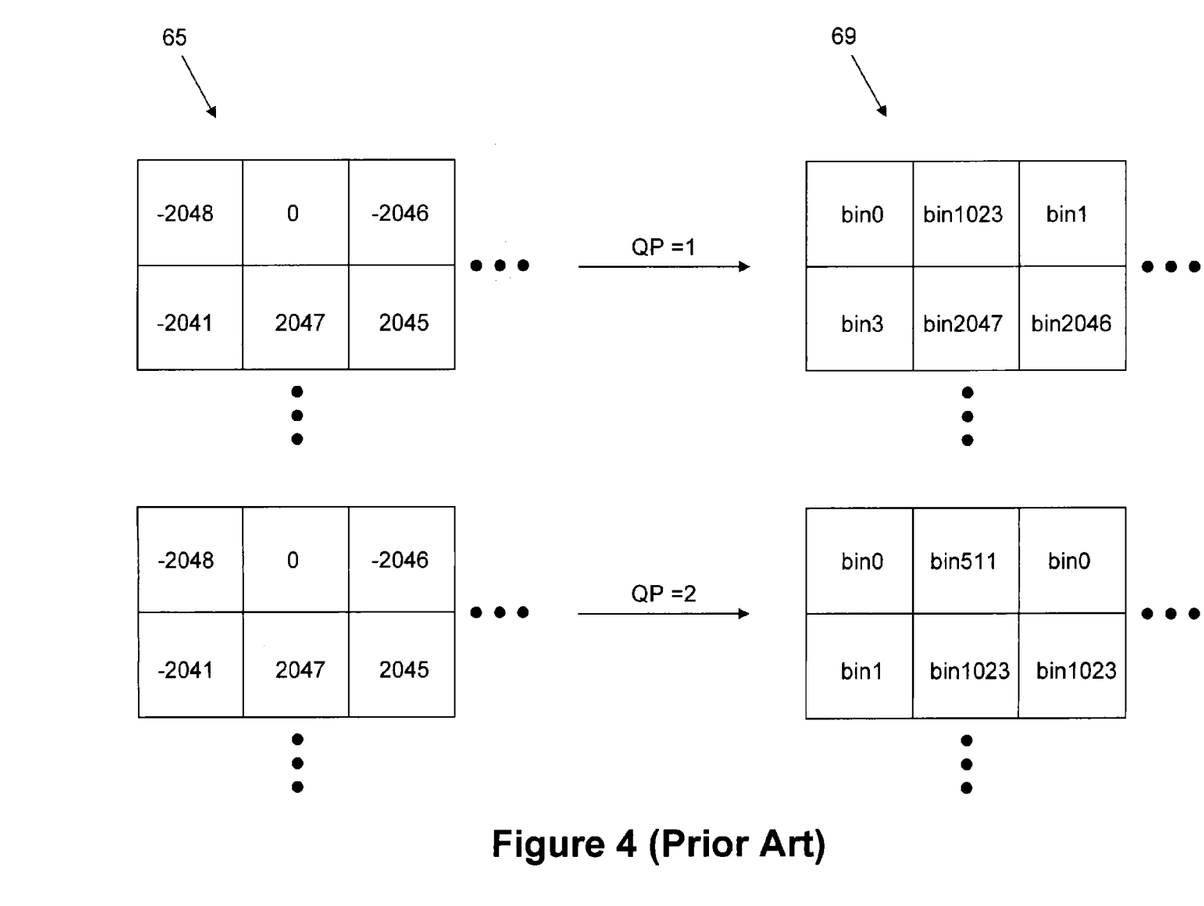
FIG. 4 shows the quantization of the DCT matrix using a quantization parameter (QP).

Further details concerning the processing and encoding of the macroblocks are shown with respect to FIGS. 3 and 4. Referring first to FIG. 3, if the encoder determines that interceding is appropriate for a particular macroblock (using $T_2$), a representation of the difference in the luminance and chrominance pixels between the current and predicted blocks are ultimately transmitted to the decoder, along with the appropriate motion vector(s). (Only the luminance difference pixels 60, and their associated blocks 61, are shown in FIG. 3 for clarity). This sample difference information is necessary for accurately reconstructing the blocks at the decoder if the shifted blocks constitute less than a perfect match (i.e., if the difference error>0). Specifically, the four luminance difference pixel blocks 61 of the macroblock of difference pixels 60 are transformed by the encoder by using a Discrete Cosine Transform (DCT) to form corresponding DCT blocks 65, as is known in the art of video compression. (Only one DCT transformed block 65 is shown for simplicity). Each element 67 in the DCT block 65 thus represents a coefficient indicative of a 2-dimensional spatial frequency of the difference pixels, and constitutes a more compact representation of this information that is more efficient to transmit.

Next, the coefficient values in the DCT block 65 are quantized to generate a quantized block of coefficients 69 to reduce the bandwidth required for the transfer, as shown in FIG. 4. In an exemplary embodiment, each element 67 in the DCT block 65 can potentially take on a coefficient value from −2048 to 2047. These values can be quantized using a quantization parameter (QP), again as is known. In a preferred embodiment, QP is determined at the macroblock level and applied to each block during transmission. The QP represents a lossy compression of the image difference information. This information is generated by quantizing the coefficient values of the elements in the DCT block into certain quantization cells or quantization bins (referred to as "bins" herein for simplicity). The size of the bins (or the steps between the coefficient values) is normally twice the QP value. Thus, if the QP=1, the range of potential values (e.g., 4096, from −2048 to 2047) may be spanned using a total of 2048 bins, with the first two values (−2048, −2047) prescribed to bin 0, the next two (−2046, −2045) prescribed to bin 1, and so on, up to bin 2047 (2046, 2047). If QP=2, the number of bins required to quantize the coefficients is further reduced to 1024 bins, with the first four values (−2048 to −2045) prescribed to bin 0, the next four values (−2044 to −2041) prescribed to bin 1, and so on, up to bin 1023 (2044 to 2047), as illustrated in FIG. 4 for a portion of the DCT block 65. Thus, with an increasing QP and larger bin size, the quantized block 69 becomes more coarse and simplified, and accordingly requires fewer bits to transmit, although this consequently results in a lower quality of decoded video. As mentioned earlier, it is from these transformed, quantized blocks 69 that the whether-to-code threshold $T_1$ is computed and assessed, preferably using a sum of the squares error metric.

The QP can vary for the transmission of each macroblock as the encoder determines the availability of system resources. For example, if the encoder and the decoder communicate along a link (FIG. 1, element 14) with a limited bandwidth, it may not be practical to transmit a DCT block 65 without some degree of quantization, because without quantization, the encoder may not be able, in real time, to stay within the bandwidth constraints of this channel, which may happen if the image being transmitted is changing to a great degree. Accordingly, as the image processing demands increase on the encoder, the encoder can modify the QP of the DCT block 65 to prepare a quantized block 69 which can stay within the bandwidth limitations of the transmission link (e.g., QP=1 for periods of low activity, QP=10 for periods of high activity). During such periods of high image activity, the quality of the transmitted image will diminish in accordance with the increase in QP, but transmission can occur in real time without overwhelming the link bandwidth.

With this background in hand, attention can now be focused on modifications to the encoding scheme that are the subject of this disclosure. As noted above in the Background section, a problem that exists in the video encoding art is how to deal with the problem of image noise, such as the noise that is generated by the image acquisition process. In particular, this noise makes it difficult for the encoder to discern whether a stationary or static image portion is truly stationary (and therefore not needing to be recoded) or whether the image portion is moving or changing (and needs to be either interceded or intracoded). As noted, the decision to not code the noisy block ultimately involves the comparison of an error value to a coding threshold value $T_1$. In an exemplary embodiment, this error value is computed as the sum of the squares of the quantized DCT coefficients (e.g. quantized block 69).

In one aspect of the disclosed technique, this coding threshold $T_1$ is changeable or adaptable to deal with the problem of suspected noise. When adapting this threshold, the encoder reviews the encoding decisions made for the current macroblock as well as the encoding decisions made in the previous coding instance for the same macroblock. After review of these encoding decisions, the encoder then preferably conditionally adjusts the coding threshold $T_1$ for the processing of the smaller blocks within the current macroblock. If noise is suspected through use of this processing algorithm, the threshold $T_1$ is increased to make it more difficult to encode the individual blocks, the theory being that the previous coding decisions for this macroblock along with the current coding decisions gives the encoder a high level of confidence that the perceived changes in the macroblock are due to noise. Given this confidence, the encoder can make it more difficult for this macroblock to be recoded by raising the coding threshold-with little risk of incorrectly identifying a portion that is truly changing as noise.

The specifics of this processing algorithm, in a preferred embodiment, are as follows. As one skilled in the art will appreciate, the hardware and/or software necessary to implement the processing algorithm is easily achieved by one skilled in the video encoding arts using the hardware and software that already exist in a standard encoder, and moreover can be achieved in numerous different ways. Accordingly, the hardware/software specifics of the implementation of the algorithm are not disclosed. Instead, the algorithm is described from a functional standpoint.

Figure 5:
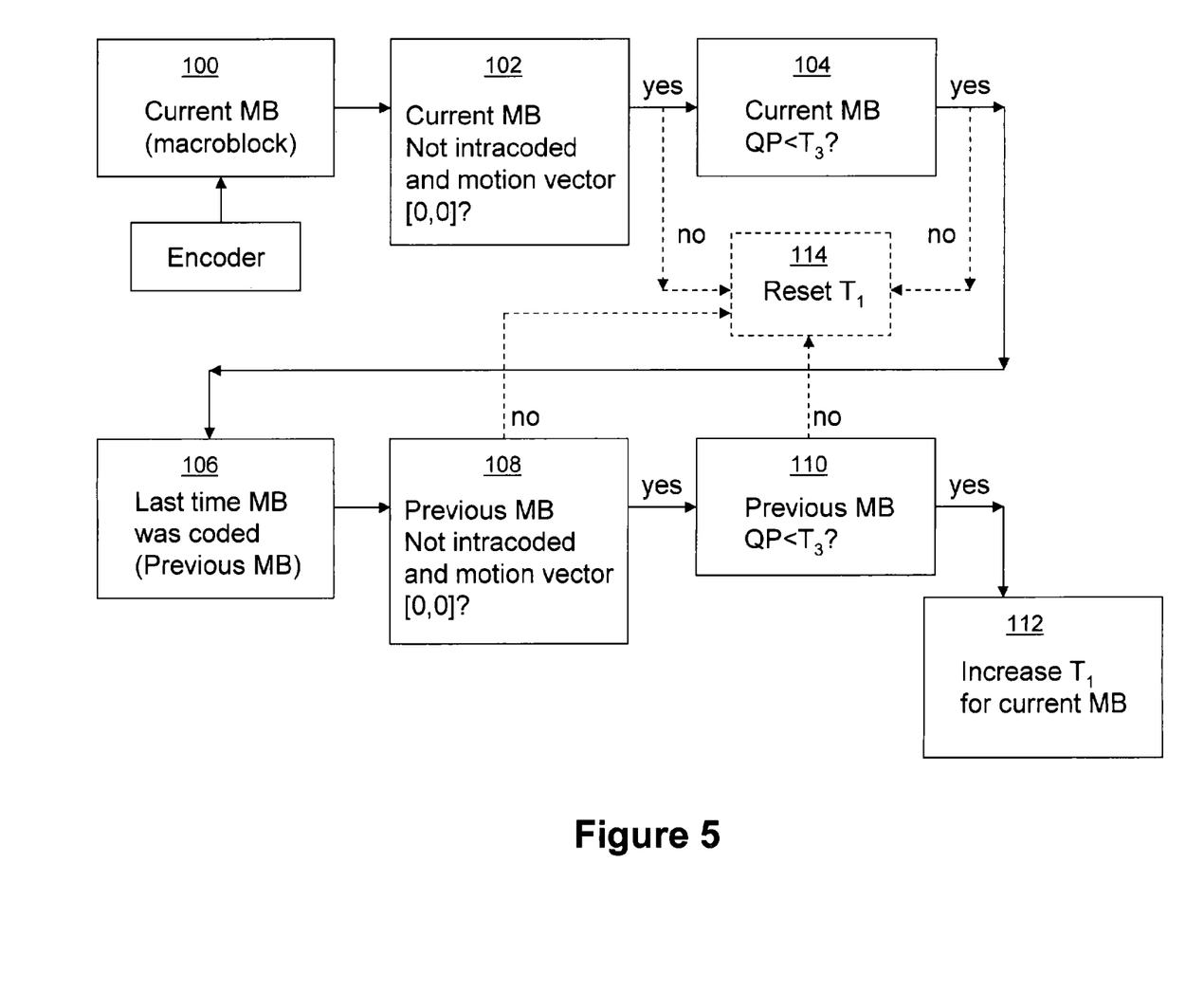
FIG. 5 shows a flow chart for a processing algorithm implementable on an encoder for changing the coding threshold ($T_1$) on the basis of coding parameters for a current macroblock and for the last previously coded version of that particular macroblock.

FIG. 5 discloses the adaptive coding threshold processing algorithm for the encoder. The algorithm starts with an assessment of the current macroblock at a given location in the image (100). The current macroblock is processed as described above to determine how it is to be coded, with either interceding or intracoding (using $T_2$ and/or other information). If the encoder has decided to code the current macroblock as inter, and if the corresponding motion vector is [0,0] (102), then the algorithm assesses the current QP for that macroblock to determine whether it is below a certain QP threshold, $T_3$ (104). If both of these determinations 102, 104 are affirmative, it suggests that the current image may not be moving or changing, and if so, that the macroblock might be uniquely susceptible to false coding decisions because of noise.

Accordingly, it becomes useful via the algorithm to verify the previous coding parameters of that macroblock (the last time this macroblock was coded) (106) to see if they are similar, i.e., if they similarly suggest a stationary image portion. If so, logic dictates that the image portion represented by the macroblock is truly stationary, this determination having been made twice in sequence. Accordingly, at step 106, the coding parameters for the last time the macroblock at issue was coded are similarly assessed. Thus, that previous coding decision is assessed to verify if the macroblock was inter-coded with a [0,0] vector (108), and was quantized with a low quantization value (i.e., below $T_3$) (110). If so, extra confidence is had that the image portion represented by the macroblock is truly not moving or changing. Since this particular macroblock had been coded in the past using the coding threshold ($T_1$) and now that it has been determined that the content that was coded was most likely noise, the coding threshold ($T_1$) can be increased for the current blocks in the current macroblock (112) (or alternatively in other embodiments, for the entire current macroblock). This increase in the threshold will make it less likely that, all other things being equal, the blocks in this particular macroblock will be coded. In short, the processing algorithm, once it determines from the history of a macroblock that that macroblock is stationary or static, it becomes more difficult for the blocks within that macroblock to become (unnecessarily) coded. This decision reduces the computation required by the encoder and also allows more efficient use of the link bandwidth available to the encoder, resulting in an overall improvement in the decoded image quality.

The coding threshold ($T_1$) is highly adaptive and is easily reset. In a preferred embodiment, should the coding threshold $T_1$ be adjusted (i.e., increased) for the processing of a current macroblock, the threshold for that block is thereafter adjusted back to its original value, such that the next current macroblock will then again be processed via the algorithm and again adjusted if necessary.

Alternatively, and as shown in FIG. 5, the coding threshold $T_1$, when adjusted, can remain adjusted for the processing of the next current macroblock. Should the conditions of that macroblock be changed in a manner not likely reflective of noise (as evidence by intracoding or high intra error, a non-zero motion vector, or QP value greater than threshold $T_3$) $T_1$ can be reset back to its original baseline value (114) before the processing of that next current macroblock. Or, should the conditions of that macroblock continue to indicate potential noise, the coding threshold $T_1$ can be further increased.

One skilled in the art will recognize that modifications to the preferred processing algorithm are possible, but which still promote the same basic benefits. For example, the algorithm can check more that just the last time the macroblock was coded, and could additionally check even further back in time to the coding decisions made for the macroblock over a period of time (e.g., the last two times the macroblock was coded). In addition, the algorithm could also check the coding decisions of other surrounding macroblocks. Such additional checking would provide further confidence that the image was truly stationary, and that $T_1$ should be increased. Moreover, while it is preferred for the algorithm to react upon assessment of [0,0] motion vectors, this is not strictly necessary. For example, if the camera is bumped or sways for some reason, it may be reasonable for the encoder to assume that a small but non-zero motion vector (e.g., [+/−1,+/−1]) is still indicative of a stationary image, and that the receiving decoder should be informed of the same. Accordingly, the processing algorithm could be broadened to increase $T_1$ even upon receipt of such substantially non-zero motion vectors. Moreover, while is it preferred to use the same QP threshold ($T_3$) to assess both the current and previous macroblocks, different thresholds ($T_{3a}$, $T_{3b}$) could be used to further tailor the responsiveness of the algorithm. Additionally, while the preferred method performs motion estimation, inter versus intra, and QP determinations and the macroblock level, while adjusting the coding threshold ($T_1$) at the block level, it should be recognized that whether blocks or macroblocks are used could be changed in either of these steps. For example, the coding threshold $T_1$ could be affected at the macroblock level instead of at the block level.

While it is preferable to assess both the motion vectors and the QPs to assess whether the image is likely stationary, in a simpler technique only one of these parameters needs to be checked (i.e., without either steps 102 and 108, or steps 104 and 110). However, assessment of both of these steps for the current and previous macroblocks is preferred for the extra assurance it provides in determining the stationary nature of the macroblock contents.

One skilled in the art will realize that the various thresholds ($T_1$, $T_2$, and $T_3$) and methods for determining the quantization parameters (QP) disclosed herein can vary depending on the overall encoding scheme used, which can vary greatly from implementation to implementation, and which can be adjusted according to user preferences.

Figure 6:
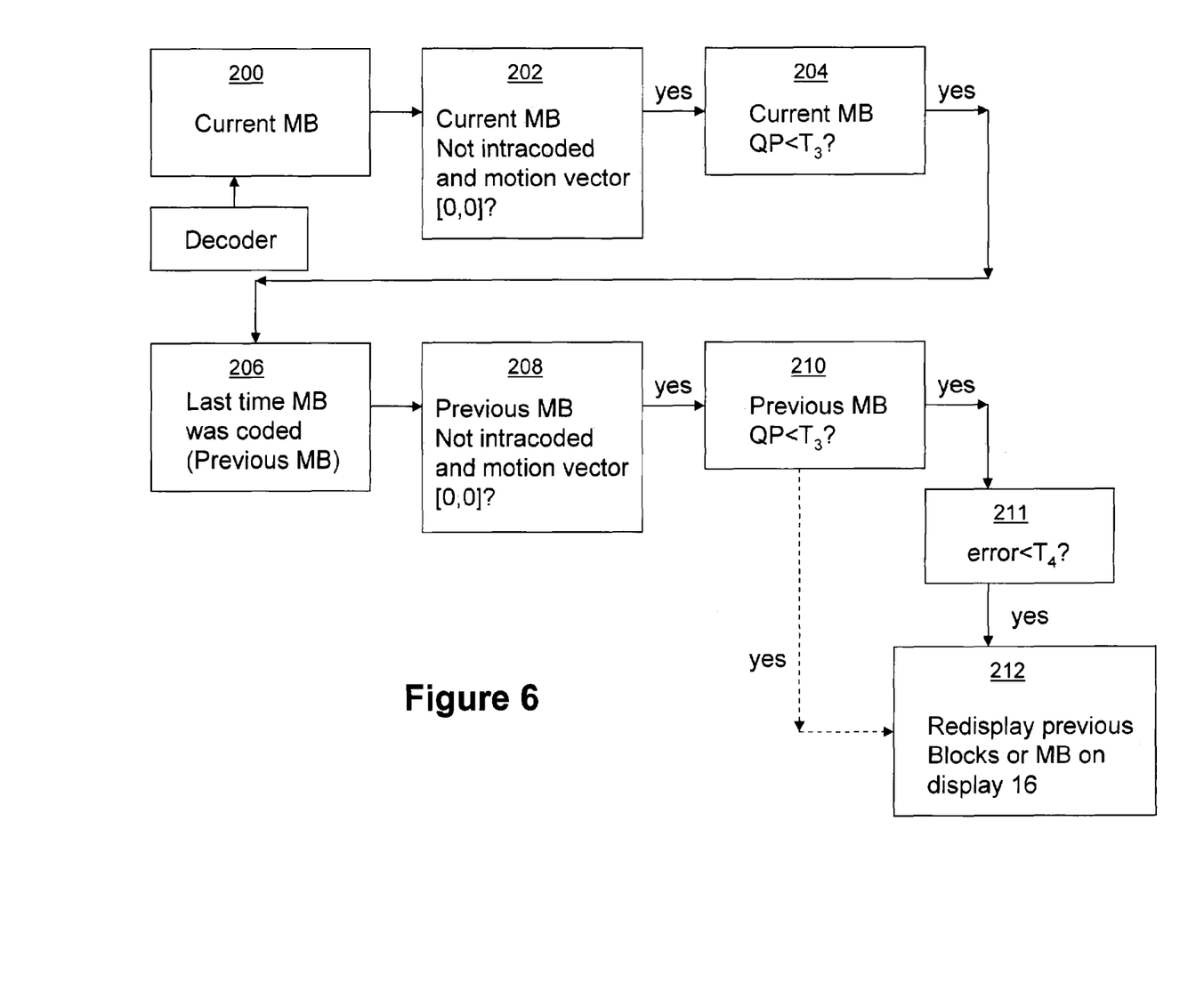
FIG. 6 shows a flow chart for a processing algorithm implementable on a decoder for updating the display of a transmitted macroblock on the basis of coding parameters for a current macroblock and for the last previously coded version of that particular macroblock.

Moreover, some of the advantages disclosed herein can be obtained without the encoder ever actually adjusting the coding threshold $T_1$. This is shown in FIG. 6, which provides a modified algorithm implementable at the decoder side of the video conferencing system. Because the decoder must necessarily receive the same coding parameters that were assessed by the encoder to properly decode the transmitted blocks, the decoders can similarly use these parameters in a similar manner to not update those portions of the image on the display 16 that are likely non-moving and/or non-changing. The decoder would still have to update the reference image to keep synchronized with the encoder. The image produced by the decoder for display purposes (which has to be maintained separately from the reference image) can be conditionally updated. Thus the decoder can assess the coding decision (inter or intra), the motion vector, and the QP for the current (steps 200-204) and previous macroblock (step 206-210) as before. If these criteria are met, the decoder may suspect that the current macroblock merely contains noise and therefore that the decoder may not need to update that macroblock on the display 16 (step 212), regardless of what the decoder is told by the encoder. As an additional and optional check to the validity of this conclusion, the decoder preferably also checks to see if the error contained within the current macroblock (or blocks) is sufficiently low, e.g., below a threshold $T_4$. (step 211). This error, as on the encoder side, may be computed as the sum of the squares of the differences in the transmitted quantized blocks 69. Alternatively, the quantized blocks 69 may first be untransformed (inverse DCT transformed), and then the sum of the squares computed. (As one skilled in the art understands, Parceval's Theorem states that the sum of the squares of the transformed and untransformed blocks are linearly related, and accordingly either error computation is acceptable). If below this threshold, then the decoder may suspect that the current block merely contains noise and therefore that that block need not be updated on the display 16 (step 212). In other words, that portion of the image will be deemed stationary by the decoder and not updated with new image information. This modification of FIG. 6 would have the advantage of preventing the camera noise from causing stationary objects to appear to move, but would not offer the coding efficiency advantage discussed above when the processing algorithm is implemented on the encoder as in FIG. 5. As with the encoder embodiment of FIG. 5, this algorithm is easily implemented by one skilled in the art using the hardware/software that currently exists in standard decoders, and can be implemented in any number of ways.

Figure 7:
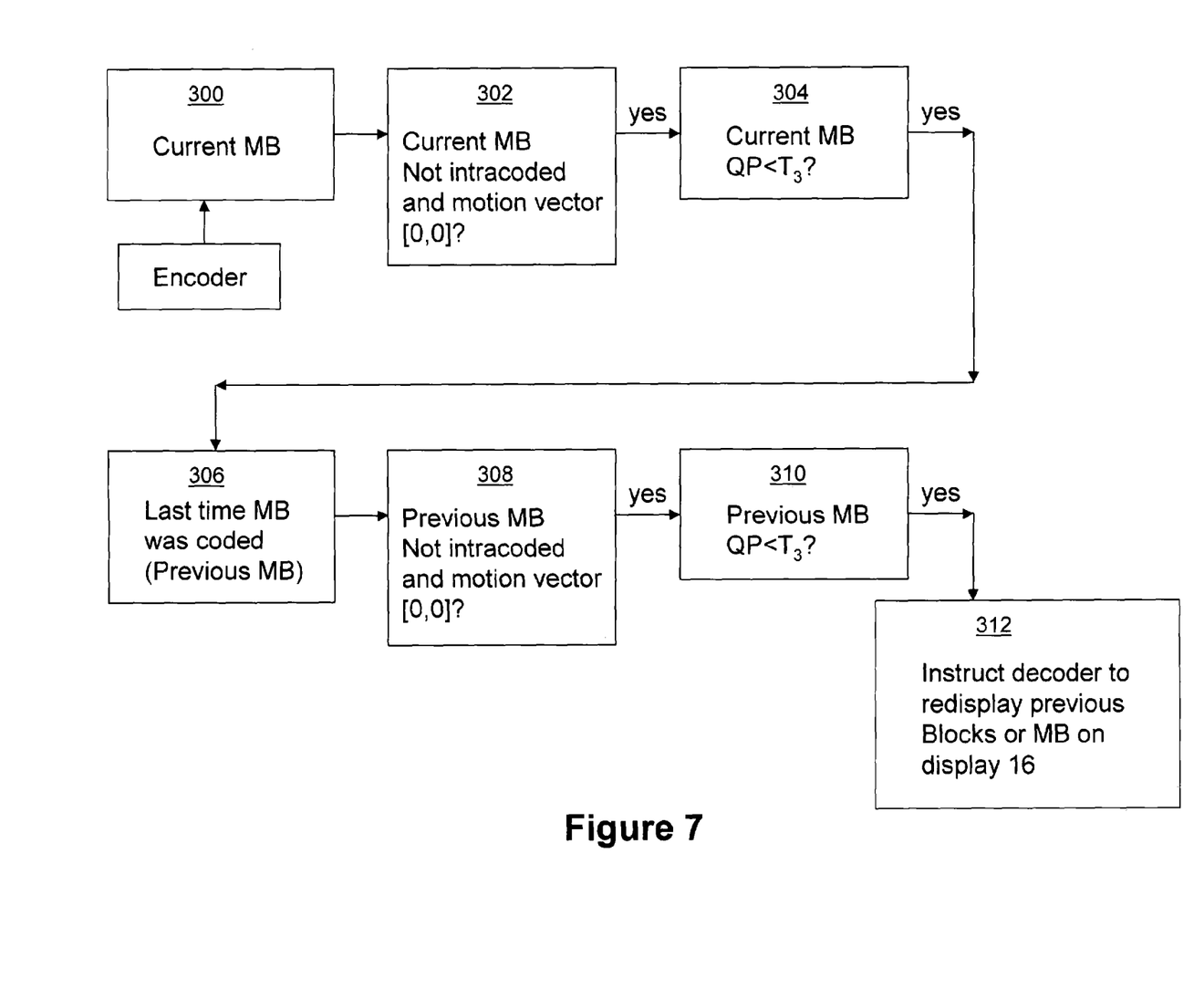
FIG. 7 shows a flow chart for a processing algorithm implementable on an encoder for sending a no code signal to the decoder on the basis of coding parameters for a current macroblock and for the last previously coded version of that particular macroblock.

Likewise, benefits can be had at the encoder side without adjustment of the coding threshold $T_1$. As shown in FIG. 7, and similar to FIG. 6, the encoder can process the algorithm (steps 300-310), and if successful, can merely instruct the decoder to display the same macroblocks or blocks that were previously displayed via transmission of a "no code" signal. This modification would offer efficiency advantages and reduced bandwidth demands on the link 14. In short, although increasing the coding threshold $T_1$ is preferable, in some embodiments such a step may not be necessary.

One skilled in the art will understand that the disclosed processing algorithms have pertinence to the processing of macroblocks, blocks, other designated portions of an image, or even an entire image itself. Accordingly, "region" as used in the claims should be understood as indicative of all of these structures.

The foregoing description of preferred and other embodiments are not intended to limit or restrict the scope or applicability of the inventive concepts contained herein. It is intended that the inventive concepts contained herein include all modifications and alterations to the full extent that they come within the scope of the following claims or equivalents thereof.

What is claimed is:

1. A method implementable on an encoder for adjusting a coding threshold for encoding a block in an image, wherein the coding threshold determines whether the block should be coded, comprising:
   encoding, at a first time, a first image representation of the block using first encoding parameters generated by the encoder;
   encoding, at a second time later than the first time, a second image representation of the block using second encoding parameters generated by the encoder;
   assessing at least the first and second encoding parameters to determine whether the image is likely stationary, wherein the first and second encoding parameters comprise at least first and second quantization parameters; and
   if the image is likely stationary, adjusting the coding threshold in the encoder for at least a portion of the block.

2. The method of claim 1, wherein the first and second image representations comprise a matrix of quantized discrete cosine transform coefficients.

3. The method of claim 1, wherein the first and second encoding parameters respectively comprise at least first and second motion vectors.

4. The method of claim 3, wherein assessing to determine whether the image is likely stationary comprises determining whether the first and second motion vectors are substantially zero.

5. The method of claim 1, wherein assessing to determine whether the image is likely stationary comprises determining whether the first and second quantization parameters are respectively below first and second quantization parameter thresholds.

6. The method of claim 1, wherein adjusting the coding threshold comprises adjusting the coding threshold to decrease the likelihood of encoding the block at the second time.

7. The method of claim 1, wherein adjusting the coding threshold comprises increasing the coding threshold.

8. The method of claim 1, further comprising:
   encoding, a third time prior to the first time, a third image representation of the block using third encoding parameters generated by the encoder; and
   assessing at least the first, second, and third encoding parameters to determine whether the image is likely stationary.

9. The method of claim 1, wherein the first and second encoding parameters respectively comprise whether the first and second image representations of the block are intercoded, and wherein assessing the first and second encoding parameters comprises an assessment whether the first and second image representations of the block are intercoded.

10. A method implementable on an encoder for adjusting a coding threshold for encoding a block in an image, wherein the coding threshold determines whether the block should be coded, comprising:
    encoding, at a first time, a first image representation of the block using at least a first quantization parameter and a first motion vector generated by the encoder;
    encoding, at a second time later than the first time, a second image representation of the block using at least a second quantization parameter and a second motion vector generated by the encoder; and
    adjusting the coding threshold in the encoder for at least a portion of the block if the first and second motion vectors are substantially zero and if the first and second quantization parameters are respectively less than first and second quantization parameter thresholds.

11. The method of claim 10, wherein the first and second image representations comprise a matrix of quantized discrete cosine transform coefficients.

12. The method of claim 10, wherein the first and second quantization parameter thresholds are the same.

13. The method of claim 10, wherein adjusting the coding threshold comprises adjusting the coding threshold to decrease the likelihood of encoding the block at the second time.

14. The method of claim 10, wherein adjusting the coding threshold comprises increasing the coding threshold.

15. The method of claim 10, further comprising:
    encoding, a third time prior to the first time, a third image representation of the block using at least a third quantization parameter and a third motion vector generated by the encoder; and
    adjusting the coding threshold in the encoder for the block if the first, second, and third motion vectors are substantially zero and if the first, second, and third quantization parameters are respectively less than first, second, and third quantization parameter thresholds.

16. The method of claim 15, wherein the first, second, and third quantization parameter thresholds are the same.

17. The method of claim 10, further comprising:
encoding, at the first time, the first image representation of the block using intercoding;
encoding, at the second time, the second image representation of the block using intercoding; and
adjusting the coding threshold in the encoder for at least a portion of the block if the first and second image representations are intercoded.

18. A method implementable on a decoder capable of displaying a block of an image on a display, comprising:
receiving from an encoder, at a first time, a first image representation of the block including first encoding parameters generated by the encoder;
receiving from an encoder, at a second time later than the first time, a second image representation of the block including second encoding parameters generated by the encoder;
assessing at the decoder whether the image is likely stationary using at least the first and second encoding parameters, wherein the first and second encoding parameters include at least first and second quantization parameters; and
if the image is likely stationary, not updating at least a portion of the block on the display.

19. The method of claim 18, wherein the first and second image representations comprise a matrix of quantized discrete cosine transform coefficients.

20. The method of claim 18, wherein the first and second encoding parameters respectively comprise at least first and second motion vectors.

21. The method of claim 20, wherein assessing to determine whether the image is likely stationary comprises determining whether the first and second motion vectors are substantially zero.

22. The method of claim 18, wherein assessing to determine whether the image is likely stationary comprises determining whether the first and second quantization parameters are respectively below first and second quantization parameter thresholds.

23. The method of claim 18, further comprising:
receiving from the encoder, a third time prior to the first time, a third image representation of the block including third encoding parameters generated by the encoder; and
assessing at least the first, second, and third encoding parameters to determine whether the image is likely stationary.

24. The method of claim 18, wherein the first and second encoding parameters respectively comprise whether the first and second image representations of the block are intercoded, and wherein assessing the first and second encoding parameters comprises an assessment whether the first and second image representations of the block are intercoded.

25. A method implementable on an encoder capable of transmitting image information to a decoder, comprising:
encoding, at a first time, a first image representation of the block using first encoding parameters generated by the encoder;
encoding, at a second time later than the first time, a second image representation of the block using second encoding parameters generated by the encoder;
assessing at least the first and second encoding parameters to determine whether the image is likely stationary, wherein the first and second encoding parameters comprise at least first and second quantization parameters; and
if the image is likely stationary, sending a no code signal to a decoder for at least a portion of the block.

26. The method of claim 25, wherein the first and second image representations comprise a matrix of quantized discrete cosine transform coefficients.

27. The method of claim 25, wherein the first and second encoding parameters respectively comprise at least first and second motion vectors.

28. The method of claim 27, wherein assessing to determine whether the image is likely stationary comprises determining whether the first and second motion vectors are substantially zero.

29. The method of claim 25, wherein assessing to determine whether the image is likely stationary comprises determining whether the first and second quantization parameters are respectively below first and second quantization parameter thresholds.

30. The method of claim 25, further comprising:
encoding, a third time prior to the first time, a third image representation of the block using third encoding parameters generated by the encoder; and
assessing at least the first, second, and third encoding parameters to determine whether the image is likely stationary.

31. The method of claim 25, wherein the first and second encoding parameters respectively comprise whether the first and second image representations of the block are intercoded, and wherein assessing the first and second encoding parameters comprises an assessment whether the first and second image representations of the block are intercoded.

* * * * *